United States Patent
Taylor et al.

(10) Patent No.: US 9,684,944 B2
(45) Date of Patent: Jun. 20, 2017

(54) GRAPH-BASED APPLICATION PROGRAMMING INTERFACE ARCHITECTURES WITH NODE-BASED DESTINATION-SOURCE MAPPING FOR ENHANCED IMAGE PROCESSING PARALLELISM

(71) Applicant: Intel Corporation, Santa Clara, CA (US)

(72) Inventors: Stewart N. Taylor, Los Altos, CA (US); Dmitry Krasnov, Nizhniy Novgorod (RU)

(73) Assignee: Intel Corporation, Santa Clara, CA (US)

( * ) Notice: Subject to any disclaimer, the term of this patent is extended or adjusted under 35 U.S.C. 154(b) by 144 days.

(21) Appl. No.: 14/664,725

(22) Filed: Mar. 20, 2015

(65) Prior Publication Data
US 2016/0210720 A1 Jul. 21, 2016

Related U.S. Application Data

(60) Provisional application No. 62/104,226, filed on Jan. 16, 2015.

(51) Int. Cl.
*G06T 1/20* (2006.01)
*G06T 1/60* (2006.01)

(52) U.S. Cl.
CPC ..................................... *G06T 1/20* (2013.01)

(58) Field of Classification Search
CPC .... G06T 1/20; G06T 1/60; G06T 9/00; G06T 9/40; G06T 17/005

USPC ........................................ 345/473–475, 619
See application file for complete search history.

(56) References Cited

U.S. PATENT DOCUMENTS

| | | | |
|---|---|---|---|
| 5,808,625 A * | 9/1998 | Picott | G06T 1/00 345/440 |
| 6,762,764 B2 * | 7/2004 | Hiwada | G06F 9/3836 345/506 |
| 8,250,556 B1 | 8/2012 | Lee et al. | |
| 8,527,972 B2 * | 9/2013 | Shimura | G06F 17/5045 717/140 |
| 8,549,529 B1 * | 10/2013 | Schildan | G06F 9/5038 718/104 |
| 2005/0235287 A1 | 10/2005 | Harper | |
| 2007/0078846 A1 | 4/2007 | Gulli et al. | |

(Continued)

OTHER PUBLICATIONS

Robert Kramer et al; "The Combining DAG: A Technique for Parallel Data Flow Analysis"; Aug. 1994; IEEE Transactions on Parallel and Distributed Systems, vol. 5, No. 8; pp. 805-813.*

(Continued)

*Primary Examiner* — Kimberly A Williams
(74) *Attorney, Agent, or Firm* — Green, Howard & Mughal LLP

(57) ABSTRACT

A flexible representation of destination-source data block dependency is included in an image graph implementation optimization API to provide a mechanism for a graph node developer to communicate limits of scheduling constraints imposed by a graph's node connections. An image graph compiler and/or image graph executor may employ the destination-source data block dependency defined through the image graph implementation API to schedule work tasks to hardware resources in a more efficient manner.

16 Claims, 13 Drawing Sheets

(56) References Cited

U.S. PATENT DOCUMENTS

| | | | |
|---|---|---|---|
| 2008/0049022 A1 | 2/2008 | Sherb et al. | |
| 2008/0117216 A1* | 5/2008 | Dorie | G06T 13/40 345/475 |
| 2011/0078500 A1 | 3/2011 | Douros et al. | |
| 2013/0103734 A1 | 4/2013 | Boldyrev et al. | |
| 2014/0359563 A1* | 12/2014 | Xie | G06F 8/34 717/106 |
| 2015/0046678 A1* | 2/2015 | Moloney | G09G 5/397 712/29 |
| 2015/0379671 A1* | 12/2015 | Brothers | G06T 1/60 345/619 |

OTHER PUBLICATIONS

Tsukasa Yamauchi et al. "SOP: A Reconfigurable Massively Parallel System and Its Control-Data-Flow based Compiling Method," NEC Laboratory, IEEE 1996, pp. 148-156.*

International Search Report and Written Opinion for International Application No. PCT/US2015/064094, mailed on Mar. 21, 2016.

The OpenVX Specificaition, Copyright 2011-2014; downloaded on Mar. 16, 2015. Found at: https://www.khronos.org/registry/vx/specs/1.0/html/ (4 pages).

Eruhimov et al., "Realtime traffic sign recognition on mobile processors", Itseez, GTC 2013. Found at: http://on-demand.gputechconf.com/gtc/2013/presentations/S3548-RT-Traffic-Sign-Recognition.pdf, (16 pages).

Gautam et al., "The OpenVX™ [Provisional] Specification", Khronos Group, Version 1.0, Document Revision: r23564, Generated on Thu Oct. 17, 2013. Found at: http://www.slideshare.net/Khronos_Group/open-vx-provisional-specification-1010r23564oct17 (304 pages).

Rainey et al., "Addressing System-Level Optimization with OpenVX Graphs", 2014 IEEE Conference on Computer Vision and Pattern Recognition Workshops (CVPRW). Found at: http://perceptonic.com/goksel/OpenVX/OpenVX_IEEE_EVW_2014.pdf (6 pages).

Trevett, "Open Standard APIs for Embedded Vision Processing", Khronos Group 2014. Found t: https://www.khronos.org/assets/uploads/developers/library/2014-gdc/Khronos-OpenVX-GDC-Mar14.pdf (28 pages).

Trevett, "APIs for Vision Acceleration, Camera Control and Sensor Fusion", Khronos Group, 2013. Found at: http://www.slideshare.net/Khronos_Group/openvx-overview (24 pages).

Non-Final Office Action, mailed Sep. 30, 2016, for U.S. Appl. No. 14/664,743.

Non-Final Office Action mailed Mar. 30, 2017 for U.S. Appl. No. 14/664,736.

Notice of Allowance mailed Mar. 29, 2017 for U.S. Appl. No. 14/664,743.

* cited by examiner

GRAPH-BASED APPLICATION PROGRAMMING INTERFACE ARCHITECTURES WITH NODE-BASED DESTINATION-SOURCE MAPPING FOR ENHANCED IMAGE PROCESSING PARALLELISM

CROSS REFERENCE TO RELATED APPLICATIONS

This application claims the benefit under 35 U.S.C. Sec. 119(e) of U.S. provisional application 62/104,226 titled "Graph-based Application Programming Interface Architectures and Optimization Engines For Enhanced Image Processing Parallelism," filed Jan. 16, 2015.

BACKGROUND

Computer vision processing (e.g., face/body/gesture tracking, object and scene detection/reconstruction, automated visual inspection, etc.) is becoming an increasingly important capability of computing device platforms. Accelerated visual processing optimized for performance and/or power is particularly important for real time, mobile, and/or embedded device applications. Increasingly powerful processors and image sensors are enabling computing platforms with greater visual intelligence. However, distributing complex vision processing algorithms across device platform processors best suited to the application remains a difficult problem.

A typical image processing application performs several successive operations on images with the output of one operation used as the input of another operation (e.g., pipeline stages). A graph-based image processing implementation optimization API provides a useful level of abstraction for vision processing execution and memory models, and provides a formal description of an operation sequence as a directed acyclic graph (DAG). The DAG is a collection of nodes that describe the image processing tasks by means of connections between them. Nodes of a graph correspond to source and destination data (e.g., images) or to operations on images. Edges of a graph define data flow in a task. A connection between nodes means that the result of one operation ("output") is used as the input for another operation. Each node may be associated with one or more hardware resource where the node is to be executed.

The OpenVX 1.0 specification released October 2014 by the Khronos Group, is one example of a graph-based image processing implementation optimization API providing a framework for managing and executing graphs. With such an API, an application developer may define image processing tasks by building a graph of the image processing functions and rely on the API framework for implementation over a wide array of platforms. An implementer provides a graph compiler and graph executor that is compatible with the graph-based implementation API and is configured to most efficiently execute image processing tasks for a given implementation by passing image data through the graph nodes.

It is advantageous for a graph-based image processing implementation API to provide implementers with the information needed to make task/work assignments and scheduling decisions that may, for example, improve efficiency through parallelism.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
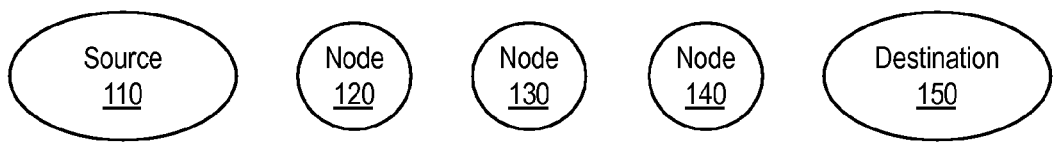
FIG. 1A illustrates nodes to be included in an image processing graph, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in a central processor core. Certain other portions may be implemented in hardware, firmware, software, or any combination thereof. At least some of the material disclosed herein may also be implemented as instructions stored on a machine-readable medium, which may be read and executed by one or more programmable processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for extracting parallelism in an image graph processing. Techniques and architectures described below for exemplary image processing embodiments can be applied to many other data blocks generalized to technologies such as, but not limited to, signal processing and audio/video coding. In some embodiments, a flexible representation of destination-source data block dependency is included in a graph-based image processing implementation API to provide a graph node developer with a mechanism to communicate limits of scheduling constraints imposed by a graph's node connections. In some embodiments, an image graph compiler and/or image graph executor employ destination-source data block dependency defined through the graph-based image processing implementation API to schedule work tasks on hardware resources in a more efficient manner (e.g., with parallelism at the data block level).

In some embodiments, an engine for executing a set or series of imaging operations is expressed by an image processing software developer as a graph or series of function calls. A graph is a class of objects that contain all information to organize calculations among nodes in the graph. A graph class interface of a graph API enables adding nodes to a graph and connecting their input and output ports. Nodes of an image processing graph correspond to source and destination data and operations to be performed on images (image data blocks). FIG. 1A illustrates a set operations with each operation contained in a compute node (e.g., node 120, node 130, node 140) or source/destination node. Source node 110 and destination node 150 are each a data array or data stream entered into the graph explicitly.

Each operation of a compute node may be selected, for example, from a library of many hundreds/thousands of functions. Any low level compute library or API (e.g., an OpenCL compliant library) may be enlisted within each node. In some embodiments, the compute note functions are designed for whole image processing. The image graph implementation API provides function(s) for creating/adding nodes, for example:

```
// Create Nodes
SrcNode::Params src1Params( );
Node *in1=nfIA.CreateNode(SrcNode::NodeUniqueName( ),
&src1Params);
...
SimpleNode_2_1::Params simple1Params(idmAdd);
Node *add=nfIA.CreateNode(SimpleNode_2_1::NodeUniqueName( ),
&simple1Params);
```

Figure 1B:
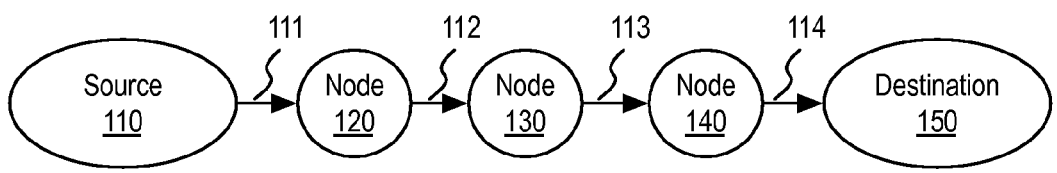
FIG. 1B illustrates connecting nodes into an image processing graph, in accordance with some embodiments.

Node objects contain information about node connectivity (number of input and output ports) and the main parameters for the function associated with the node. Objects of derivative classes can contain other parameters, depending on the node function. FIG. 1B illustrates a connection of nodes to create image processing tasks. The graph edges 111, 112, 113, 114 are provided by the image processing software developer to define the flow of the data array/data stream from source node 110 through the compute nodes 120, 130, 140, to destination node 150. The graph-based implementation API provides function(s) for connecting an image graph, for example:

```
// Connect Graph
g->Link(in1Id,0, addId,0);
```

Numbers of objects and ports are used by the Link method to connect the output port of one object with the input port of another object.

Figure 1C:
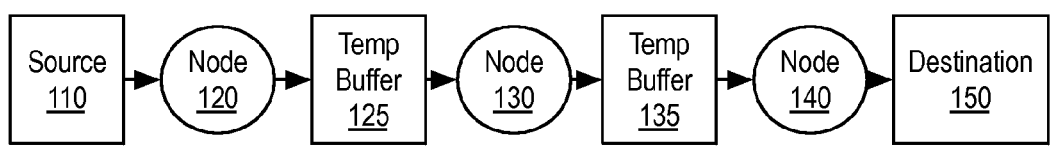
FIG. 1C illustrates execution of an image processing graph, in accordance with some embodiments.

In some embodiments, the image graph is then transformed, or compiled, by a graph compiler into a sequence of image processing function calls that are applied to data blocks or small parts of the input image data referred to herein as a tiles. Tiles include slices having the whole width of an image, as well as rectangles of arbitrary dimension and orientation within an image. A compile member function of a class compiles the graph object. During compile, the graph is verified for absence of cycles, absence of isolated nodes, correspondence of data types and number of channels between nodes. In embodiments, the compile function is further responsible for determining an optimal tile size according to an available cache size. During image graph execution, the passage of a data block through compute nodes between source node 110 and destination node 150 constitutes a series of image processing tasks. As illustrated in FIG. 1C, execution of the image graph may be conceptualized with temporary buffers 125, 135 inserted between compute nodes 120, 130 and 130, 140, respectively used for retaining the results of each task.

Figure 2A:
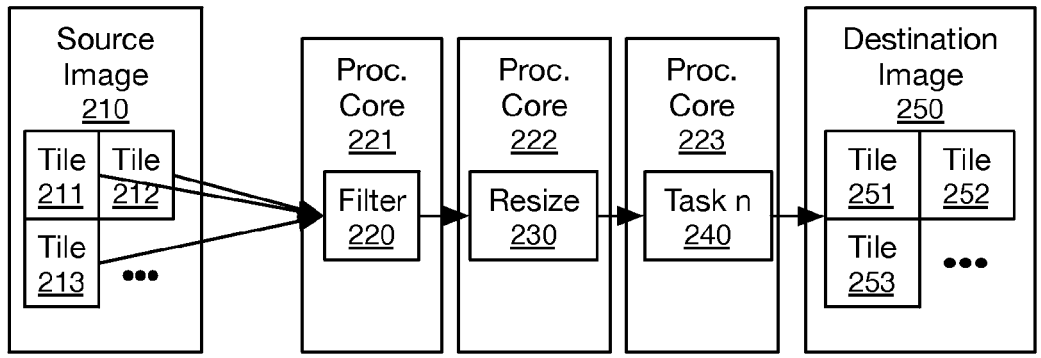
FIG. 2A illustrates graph-based optimization through task-based decomposition, in accordance with some embodiments.

In some embodiments, a graph optimization engine performs a graph-based optimization entailing a task-based decomposition. For task-based decomposition, the output of one operation (e.g., in node 120) used as the input of another operation (e.g., in node 130). An example of a graph-based optimization through task-based decomposition is illustrated in FIG. 2A, where separate processor cores or compute units are assigned different tasks. For example, a processor core 221 is responsible for a filter 220, processor core 222 is responsible for a resize 230, and processor core 222 is responsible for an $n^{th}$ task. Many image processing applications utilize very large images (e.g., several megapixels), and the total memory used for image processing may exceed the size of a local buffer (e.g., a second-level cache of a processor). In these conditions the bottleneck becomes memory access, so source image 210 is decomposed into data blocks associated with sections of source image 210. These image fragments (e.g., source tiles 211, 212, 213) are then processed by processor cores 221, 222, 223 to generate destination tiles 251, 252, 253 of destination image 250.

Figure 2B:
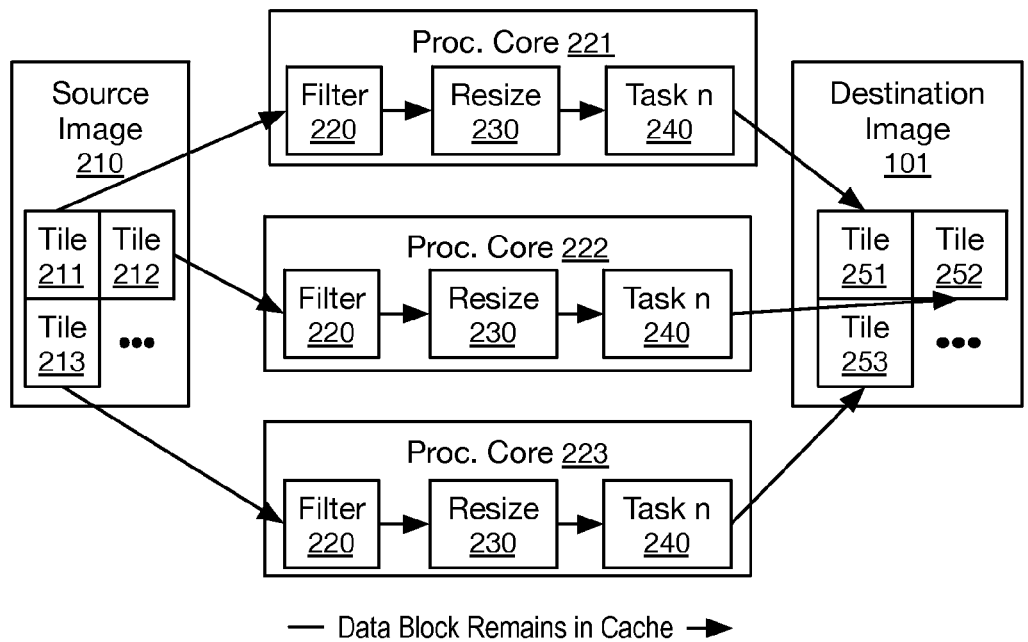
FIG. 2B illustrates graph-based optimization through spatial decomposition, in accordance with some embodiments.

In some embodiments, a graph optimization engine performs a graph-based optimization entailing a tile-based, or spatial, decomposition. As illustrated in FIG. 2B, each processor core 221, 222, 222 is responsible for performing the filter 220, resize 230, and the $n^{th}$ task 240 for one source tile 211, 212, 213, respectively. As an example, one efficiency possible with tile-based decomposition is the retention of a data block (e.g., corresponding to one tile) within a local memory buffer (e.g., a level-two cache associated with a processor core) as successive tasks are performed on the data block.

Figure 2C:
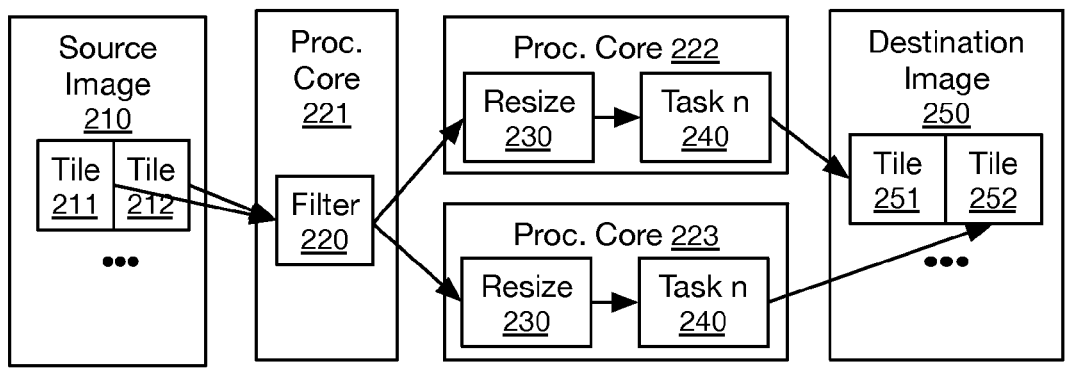
FIG. 2C illustrates a graph-based optimization entailing both spatial and task decomposition.

In some embodiments, a graph optimization engine performs a graph-based optimization entailing both spatial and task decomposition. As depicted in FIG. 2C, processor core 221 is responsible for filter 220, which may be computationally expensive relative to resize 230 and $n^{th}$ task 240. Processor cores 222 and 223 may be assigned the resize 230 and $n^{th}$ task 240 to output a separate destination tile 251, 252 from one source tile 211, 212. Processor core 221 processes both source tiles 211, 212 to complete filter task 220.

Figure 2D:
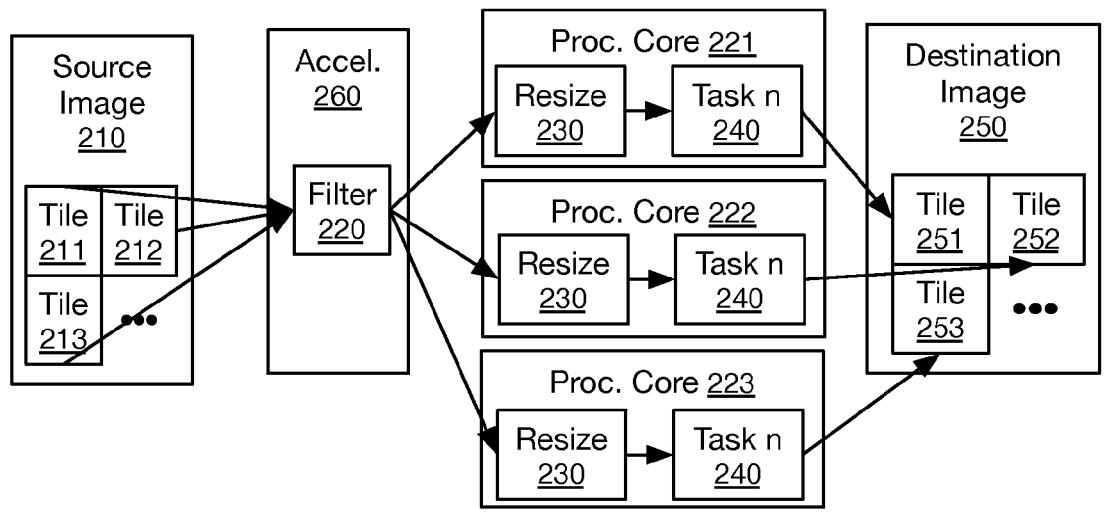
FIG. 2D illustrates both spatial and task decomposition over heterogeneous hardware resources, in accordance with some embodiments.

In some embodiments, a graph optimization engine performs a graph-based optimization entailing either or both spatial and task decomposition over heterogeneous hardware resources. FIG. 2D illustrates both spatial and task decomposition over heterogeneous hardware resources including a hardware accelerator 260 in addition to multiple cores of a processor. In the depicted example, accelerator 260 handles filter task 220 for all source tiles 211, 212, and 213. One processor core 221, 222, 223 is responsible for performing both resize task 230 and $n^{th}$ task 240 on a filtered data block corresponding to one source tile 211, 212, 213, respectively.

Explicitly splitting a source image into fragments and performing the required operation on these fragments is particularly difficult if an operation requires data outside an image fragment, or the processing operations require a change in the fragment size. Furthermore, in the above embodiments, parallelization of the calculation sequence may be advantageous. For example, the processing of one image fragment, then another, need not be scheduled such that all fragments are processed through a first task by one hardware resource before any fragment is processed through another task by another hardware resource. Greater processing efficiency may be had where processing of a fragment through one task is instead predicated only on that fragment having been first processed through a preceding task, regardless of the status of any other fragment processing.

In some embodiments, a graph node includes one or more descriptor of dependency of a source data block (i.e., a producer tile) on a destination data block (i.e., consumer tile). Input-output data block mappings defined at the node level supplement the node-based interconnections defined at the graph level. While node-based interconnections facilitate task decompositions, without data dependency information, a graph compiler is limited to interpreting the node interdependencies as absolute (i.e., all source data must pass through a first node before any source data may pass through a second node). An input-output data block mapping at the node level however enables a graph compiler to determine the limits of the node interdependencies so that parallelism may be extracted, for example through a function call.

Figure 3A:
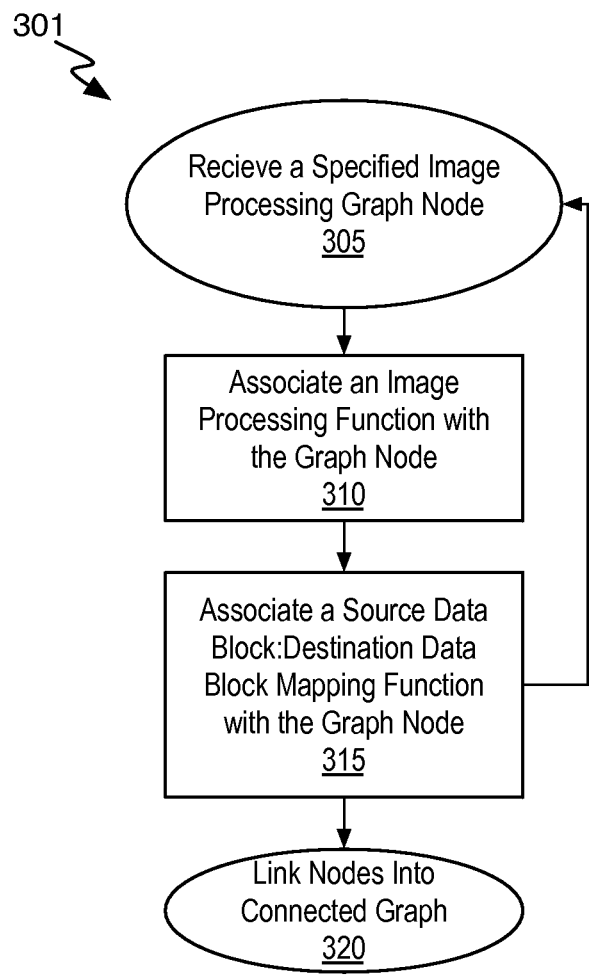
FIG. 3A is a flow diagram illustrating an image graph node mapping method, in accordance with some embodiments.

In some embodiments, a graph-based image processing implementation API provides a framework for defining a source data block-to-destination data block mapping at the graph node level. FIG. 3A illustrates a node mapping method 301. Method 301 may, for example, be performed by an image processing software application. Method 301 begins with receiving a specification of an image processing graph node at operation 305. At operation 310, an image processing function is associated with the node, defining a compute node such as any of nodes 120, 130, 140 illustrated in FIG. 1A. At operation 315, a source data block that is to be operated upon with the image graph node processing function is associated with a destination data block to be output from the graph node. The source data block-to-destination data block mapping may be any mapping function (method) that parameterizes source and destination blocks in a form that enables a graph compiler to determine data block dependency information for the node.

Figure 4A:
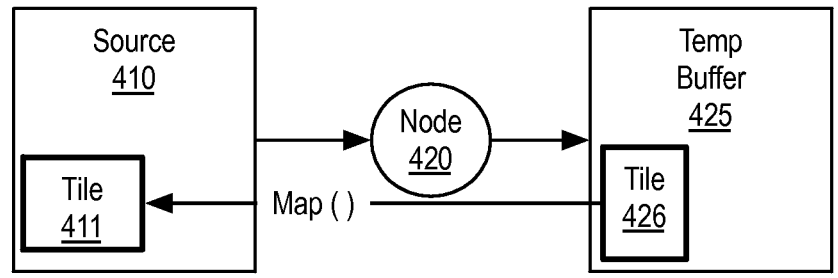
FIG. 4A is a functional block diagram illustrating a graph node-level input/output data block mapping function, in accordance with some embodiments.

In an exemplary embodiment further illustrated in FIG. 4A, the data block mapping is expressed as a node-level mapping function Map( ). The node-level mapping function Map( ) takes an output tile of data and returns an input tile of data on which it depends. A mapping function may, for example, parameterize a tile with one or more of a width, height, origin, orientation, etc. As illustrated in FIG. 4A, a mapping function in node 420 is to receive a parameterization of destination tile 426 corresponding to a data block location in temporary buffer 425 and return a parameterization of source tile 411 corresponding to a data block location in source 410. Hence, the mapping function Map( ) provides a general mechanism to describe the dependencies between input and output data for each operation node. The mapping function thereby provides a framework for externalizing data flow management whereas a graph-based implementation API lacking such a mapping function internalizes data flow management within each node. A node developer may readily define node-level or "node-based" mapping in conjunction with defining the compute function(s) to be called during node execution. In some embodiments, the node level input/output data mapping is defined as either a public member function of the graph-based implementation API or as an overridden public member function. For example:

| virtual idmStatus DMIP::Node::GetProducerRect | ( IppiRect * | producer, |
|---|---|---|
| | const IppiRect & | consumer, |
| | int | in_port, |
| | int ) | out_port | the GetProducerRect( ) data block mapping function outputs producer pointer to a rectangle in the source image based on input parameters consumer (parameterization of a particular consumer rectangle in the output/destination image), in_port (specifying a source port number), and out_port (specifying a destination port number). A call to the GetProducer Rect( ) mapping function by the graph compiler yields a description of the dependency from destination rectangle (consumer) to source rectangle (producer).

In further reference to FIG. 3A, in some embodiments operations 305, 310, and 315 are iterated to specify an input/output data mapping function for each of a plurality of graph nodes. In some exemplary embodiments, each compute node in an image graph includes a specification of a source-to-destination data block mapping. The node-level mappings may then provide a complete dependency chain extending through all nodes of a graph. The most robust extraction of parallelism is possible for exemplary embodiments where each and every compute node created and/or added to an image graph includes a consumer-producer data block mapping function. For a graph-based image processing implementation API lacking a node-level input/output source mapping function, such parallelism could be extracted only if a graph compiler relies on an implicit assumption that each node of a graph has the same data block dependency with any deviations from that default then having to be handled uniquely as special cases. Following the paradigm introduced here however, data block dependency may be varied across any and all graph nodes. In one example where a graph node is to perform a 90° image rotation, the consumer rectangle depends on a producer rectangle that is rotated by 90°. Such a node may include the following compute function to determine the source rectangle srcRect within a region of interest (ROI):

```
static inline void Rotate90CalculateSrcRech(IppiRect& srcRect, double
angle, IppiSize srcRoi, IppiSize dstRoi, IppiRect dstRect)
{
double xCenterSrc = (srcRoi.width − 1) * 0.5;
double yCenterSrc = (srcRoi.height − 1) * 0.5;
double xCenterDst = (dstRoi.width − 1) * 0.5;
double yCenterDst = (dstRoi.height − 1) * 0.5;
double xShift = 0, yShift = 0;
ippiGetRotateShift(xCenterDst, yCenterDst, −angle, &xShift, &yShift);
xShift −= xCenterDst − xCenterSrc;
yShift −= yCenterDst − yCenterSrc;
double bound[2][2];
ippiGetRotateBound(dstRect, bound, −angle, xShift, yShift);
srcRect.x = bound[0][0];
srcRect.y = bound[0][1];
srcRect.width = bound[1][0] − srcRect.x + 1;
srcRect.height = bound[1][1] − srcRect.y + 1;
}
```

The GetProducerRect( ) data block mapping function included in the node may then be provided as:

```
idmStatus Rotate90Node::GetProducerRect(IppiRect* producer_rc, const
IppiRect& consumer_rc, int in_port, int out_port)
{
    assert(in_port == 0 && out_port == 0);
    Rotate90CalculateSrcRect(*producer_rc, params.angle,
InputData(0).size, OutputData(0).size, consumer_rc);
    return idmOK;
}
```

As a further example of method 301, in another iteration of operations 310-315 where an image filter node is created/added, the GetProducerRect( ) data block mapping function included in a node may be provide as:

```
idmStatus BaseFilterNode::GetProducerRect(IppiRect* producer_rc, const
IppiRect& consumer_rc, int in_port, int out_port)
{
    *producer_rc = consumer_rc;
    int top, bottom, left, right;
    // get the total size of the kernel
    m_kernel->GetBorders(&top, &bottom, &left, &right);
    producer_rc->width += left+right;
    producer_rc->height += top+bottom;
    return idmOK;
}
```

In some embodiments, a graph-based implementation API provides a framework for defining internal data block dependency at the graph node level. Internal data block dependency specifies one or more data blocks in a destination image that should be calculated before a particular data block in the destination image. With such an image processing graph architecture, a graph compiler can optimize parallelism over many data blocks for one graph node even where an image processing function of the node requires a serialization at the data block level. For example, an error diffusion function may carry over error associated with processing a first source (producer) data block into a first destination (consumer) data block for further application of the error in the processing of a second source data block into a second destination data block. Hence, an internal tile dependency exists at the error diffusion node where the second source data block should not be processed until the first source data block has passed through the error diffusion node.

Figure 4B:
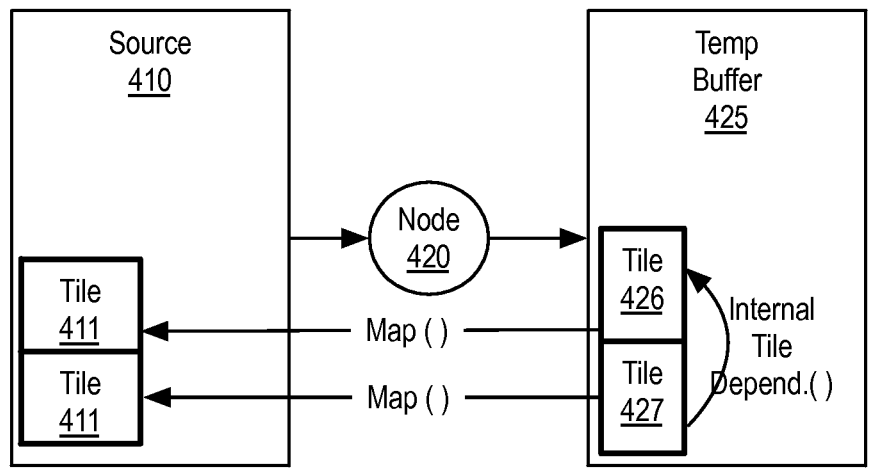
FIG. 4B is a functional block diagram illustrating a graph node-level output/output data block mapping function, in accordance with some embodiments.

In an exemplary embodiment further illustrated in FIG. 4B, an internal tile mapping function is expressed as an output/output dependency mapping function InternalTileDependency( ). The internal mapping function indicates a dependency of output tile 427 on output tile 426. Dependency for each of the output tiles 426, 427 on input tiles 411, 412 is further characterized through mapping function Map( ). In some embodiments, the node level output/output data mapping is defined as either a public member function of the graph-based implementation API or as an overridden public member function. For example:

```
virtual idmStatus              ( std::list<
DMIP::Node::InternalTileDependency    Tile > *   tiles,
                                      const
                                      Tile      tile,
                                      &
                                      int       out_port
                               )   .
```

A list of predecessor outputs tiles is returned for an input (dependent) tile for a specified destination port out_port. A compiler may be informed to call this method based on flag, etc. For the specific example of an error diffusion node, the InternalTileDependency( ) output/output mapping function characterizing internal tile dependency for the node may be structured as:

```
idmStatus ErrorDiffusionNode::InternalTileDependency(std::list<Tile>*
tiles, const Tile& tile, int out_port)
{
  if (!m_useSlices)
  {
    if (tile.y > 0)
      tiles->push_back(Tile(tile.x + 1, tile.y – 1));
    // TODO Is dependency is needed? tiles->push_back(Tile(tile.x, tile.y –
    1));
    if (tile.x > 0)
      tiles->push_back(Tile(tile.x – 1, tile.y));
  }
  else
  {
    if (tile.y > 0)
      tiles->push_back(Tile(tile.x, tile.y – 1));
  }
  return idmOK;
}
```

Upon creating all graph nodes, method 301 is then completed with linking the nodes into a connected graph at operation 320 for example using any conventional techniques. The image graph is then ready for graph compilation.

Figure 3B:
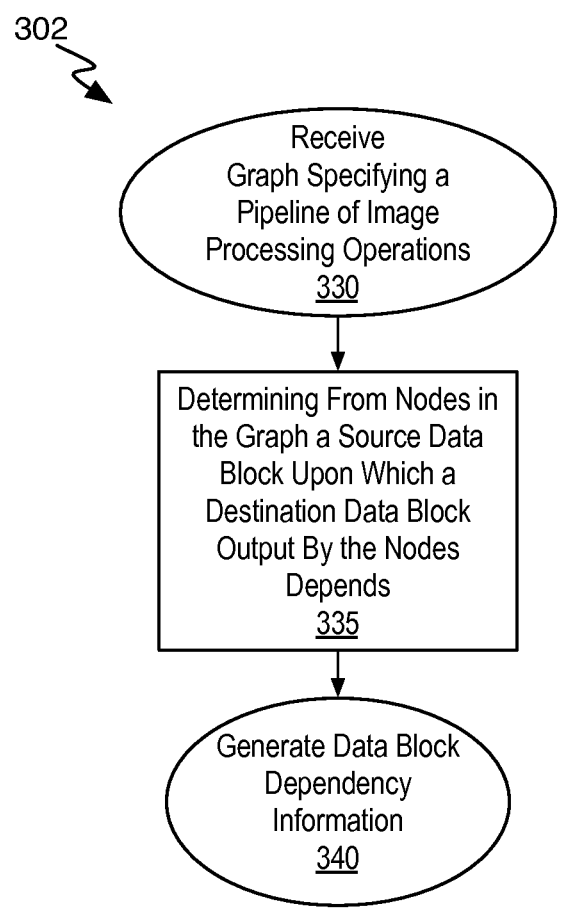
FIG. 3B is a flow diagram illustrating an image graph compile method, in accordance with some embodiments.

FIG. 3B illustrates a graph compile and/or execution method 302, at least a portion of which may be performed, for example, as part of a JIT compilation process. In embodiments, the graph compiler splits input images into fragments (tiles) containing several successive rows, allocates memory for intermediate buffers, and defines what operations are to be performed on the tiles. In some embodiments, a graph compiler and/or graph executor calls one or more mapping functions within a node to determine an input/output data block dependency for the node. In some embodiments, a graph compiler and/or graph executor calls one or more mapping functions within a node to determine an output/output data block dependency for the node. In further embodiments, the graph compiler makes successive calls to one or more mapping function in each of successive nodes in a graph to determine data block dependency information as the data blocks pass through stages of the image graph during graph execution.

Method 302 begins at operation 330 where a graph specifying a pipeline of image processing tasks is received. At operation 335, a source data block upon which a destination data block depends is determined from corresponding nodes in the graph. At operation 340, data block dependency information is generated based on the source-to-destination (input/output) data block mapping determined from the nodes. In further embodiments, data block dependency information is generated further based on the internal destination-to-destination (output/output) data block mapping determined from the nodes.

Figure 4C:
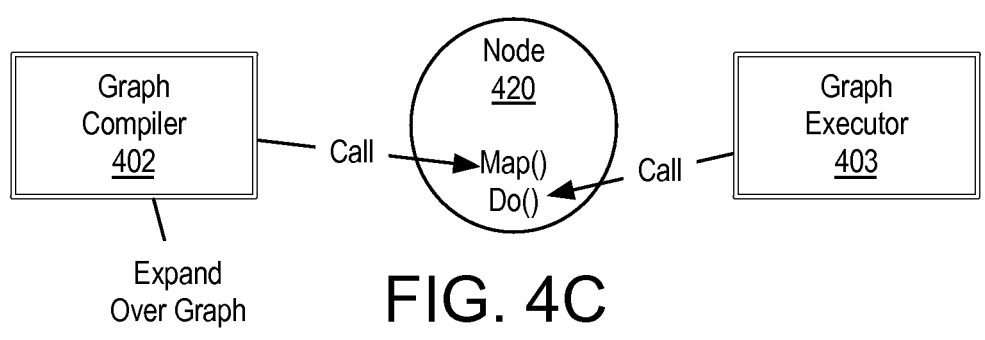
FIG. 4C is a functional block diagram illustrating a graph compiler calling a node-level data block mapping function, in accordance with some embodiments.

In the exemplary embodiment illustrated in FIG. 4C, when a mapping function in node 420 is called by graph compiler 402 with a parameterization of destination tile 426 (FIG. 4A) corresponding to a data block in temporary buffer 425, the mapping function Map( ) returns a parameterization of source tile 411 corresponding to a data block in source 410. In further embodiments, graph compiler 402 makes successive calls to successive nodes in a graph to determine data dependency information for the graph. In some embodiments, data dependency information is explicitly stored as a dependency tree that might have thousands of entries. In alternative embodiments, data dependency information determined from the mapping function calls is implicitly employed in the scheduling of work tasks/assignment of tasks to hardware resources without storing a dependency tree data structure to memory.

Figure 4D:
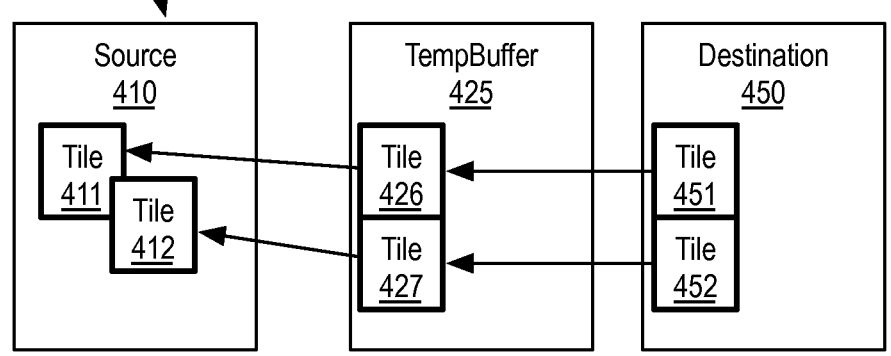
FIG. 4D is a functional block diagram illustrating successive compiler calls to node-level data block mapping functions, in accordance with some embodiments.

In an exemplary embodiment further illustrated in FIG. 4D, graph compiler 402 makes a first map function call to a (last) node outputting to a destination 450. The first map function call specifies a first destination tile 451 corresponding to a block of data to be stored in a destination image 450.

In response to the first call, an input/output data mapping function of the last node returns a specification of a source tile 426 corresponding to a block of data to be stored in temporary buffer 425. Graph compiler 402 issues a second map function call to an immediately preceding node defined in an image graph as outputting to the first node. The second map function call issues the specification of a source tile 426. In response to the second map function call, an input/output data mapping function of the preceding node returns a specification of the source tile 411 corresponding to a block of data in a source image 410. The graph compiler then has data block dependency information relating destination tile 451 with tiles 411 and 426. An additional sequence of map function calls may be issued to acquire dependency information relating destination tile 452 with tiles 412 and 427. Parameterization of the tiles 411, 412, 426, 427, 451 and 452 may then be utilized for scheduling the tasks associated with passing each tile through the graph nodes with optimal parallelism.

Figure 3C:
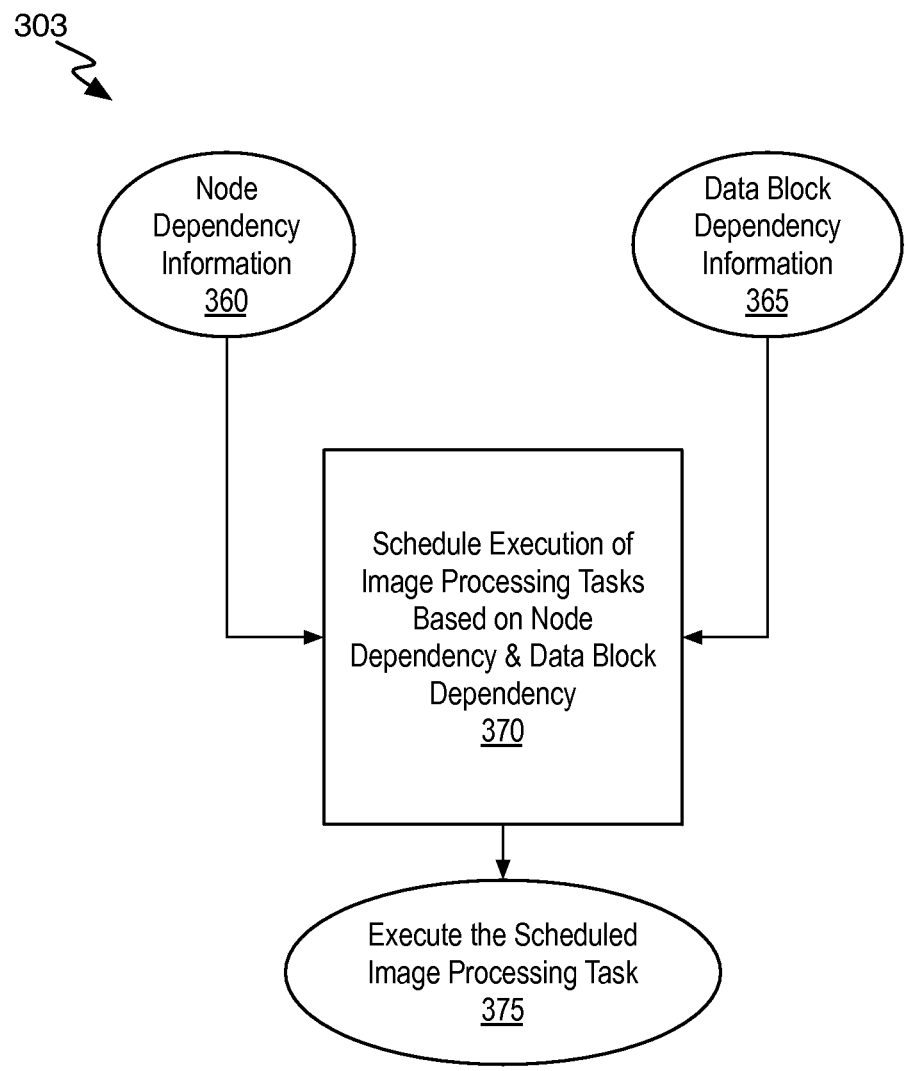
FIG. 3C is a flow diagram illustrating an image graph execution method, in accordance with some embodiments.

FIG. 3C illustrates a graph execution method 303, which in some embodiments is performed by an image graph execution engine (i.e., image graph executor). In method 303 image processing tasks are scheduled at operation 370 based on both node dependency information received at operation 360 and data block dependency information received at operation 365. The node dependency information may originate from an image graph by a graph compiler following any known technique. The data block dependency information may originate from the graph nodes by a graph compiler following the techniques described above. For example, as illustrated in FIG. 4D because of overlap between tiles 411 and 412, the associated imaging tasks are to be scheduled as predecessors to tasks generating destination tiles 451, 452. However, the tasks generating destination tiles 451, 452 may be scheduled for parallel execution dependent only on availability of their corresponding source tiles 426, 427. In further embodiments where internal tile dependencies are present, task scheduling is further predicated on the completion of predecessor tasks associated to ensure predecessor output tiles are prioritized over internally dependent tiles.

Scheduling operation 370 may be implemented in any manner, as embodiments are not limited in this respect. In some exemplary embodiments, scheduling operation 370 is implemented with threading building blocks (TBB) employing any known architecture(s) and technique(s) to dynamically allocate imaging operations to individual processor cores in a manner based on the data block dependency as well as node dependency.

Figure 5:
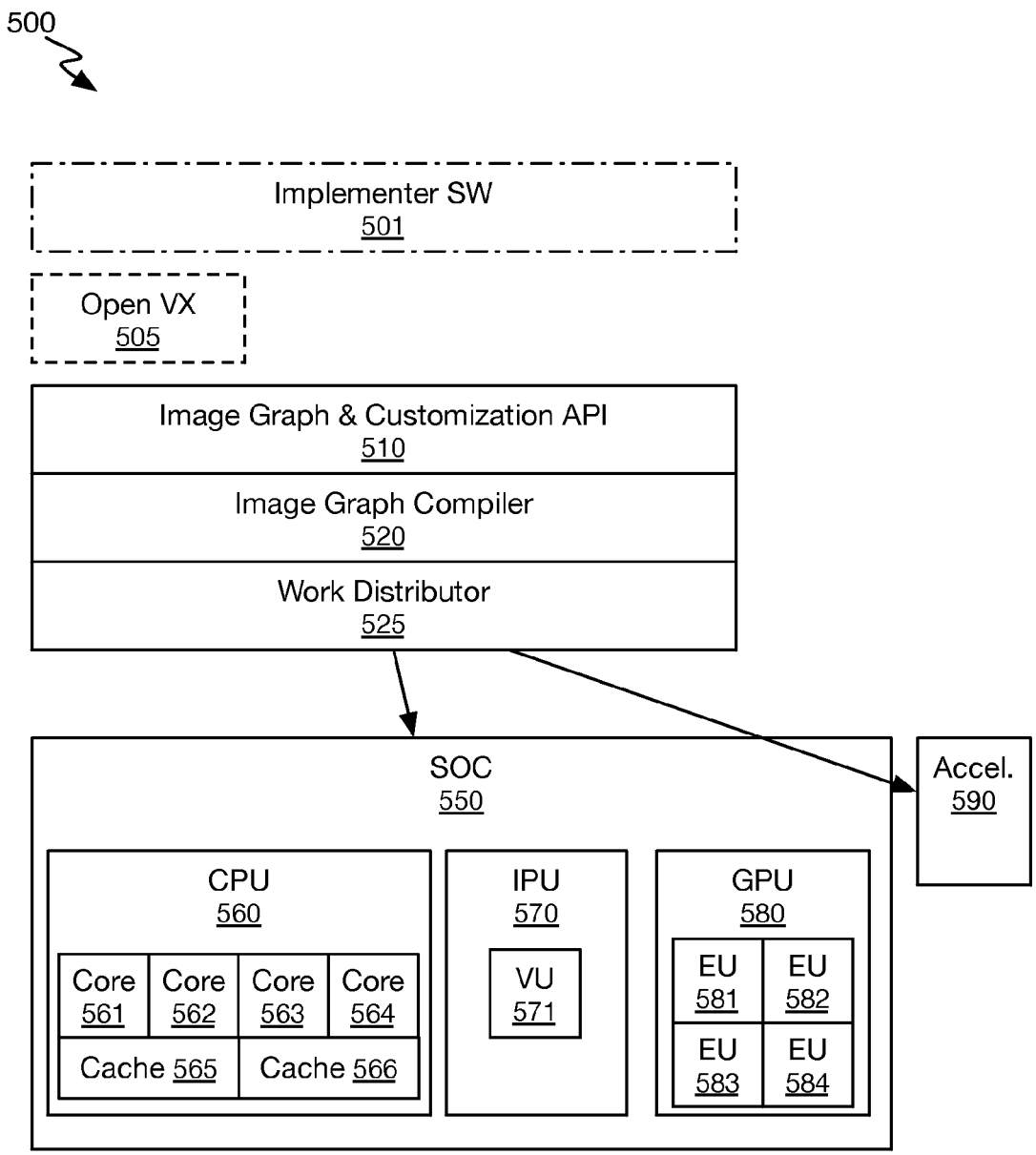
FIG. 5 illustrates an exemplary implementation of node-defined data block dependency mapping in accordance with some embodiments.

FIG. 5 illustrates an exemplary implementation 500 with node-defined data block dependency mapping in accordance with embodiments. Platform 500 includes an implementer software layer 501 that enlists a graph-based image processing implementation API 510 providing a framework for mapping data block dependencies at the node level. In some embodiments, platform 500 employs additional graph and optimization frameworks such as may be provided by an OpenVX API 505 (e.g., OpenVX API v1.0). In alternative embodiments, a standardize API, such as OpenVX may provide the framework for mapping data block dependencies at the node level substantially as described elsewhere herein. In other words, the API's 505 and 510 may be separately maintained or merged as an implementation optimization interface having the data block mapping functionality described herein. As further illustrated in FIG. 5, implementation 500 further includes an image graph compiler 520 and a work distributor 525, each of which may comprise libraries of data structures and algorithms for transforming an image graph defined in upper layers (e.g., API 510) into function calls that generate work tasks that are scheduled on hardware resources. As further illustrated in FIG. 5, implementation 500 has hardware resources including a system-on-chip (SOC) 550 and hardware accelerator 590. SOC 550 further includes a central processing unit (CPU) 560, image processing unit (IPU) 570, and graphics processing unit (GPU) 580. CPU 560 includes a plurality of processing cores 561, 562, 563, 564 interfacing with level-two caches 565, 566. IPU 570 includes a vector processing unit 571. GPU 580 includes a plurality of execution units 581, 582, 583, 584.

In embodiments, image graph compiler 520 is instantiated and/or executed by CPU 560. In further embodiments, work distributor 525 is also instantiated and/or executed by CPU 560 resulting in image processing work tasks being scheduled on one or more of CPU cores 561-564, VU 571, EU 581-584, and accelerator 590. In advantageous embodiments, image graph compiler 520 and work distributor 525 implement node defined data block-based scheduling logic.

Figure 6:
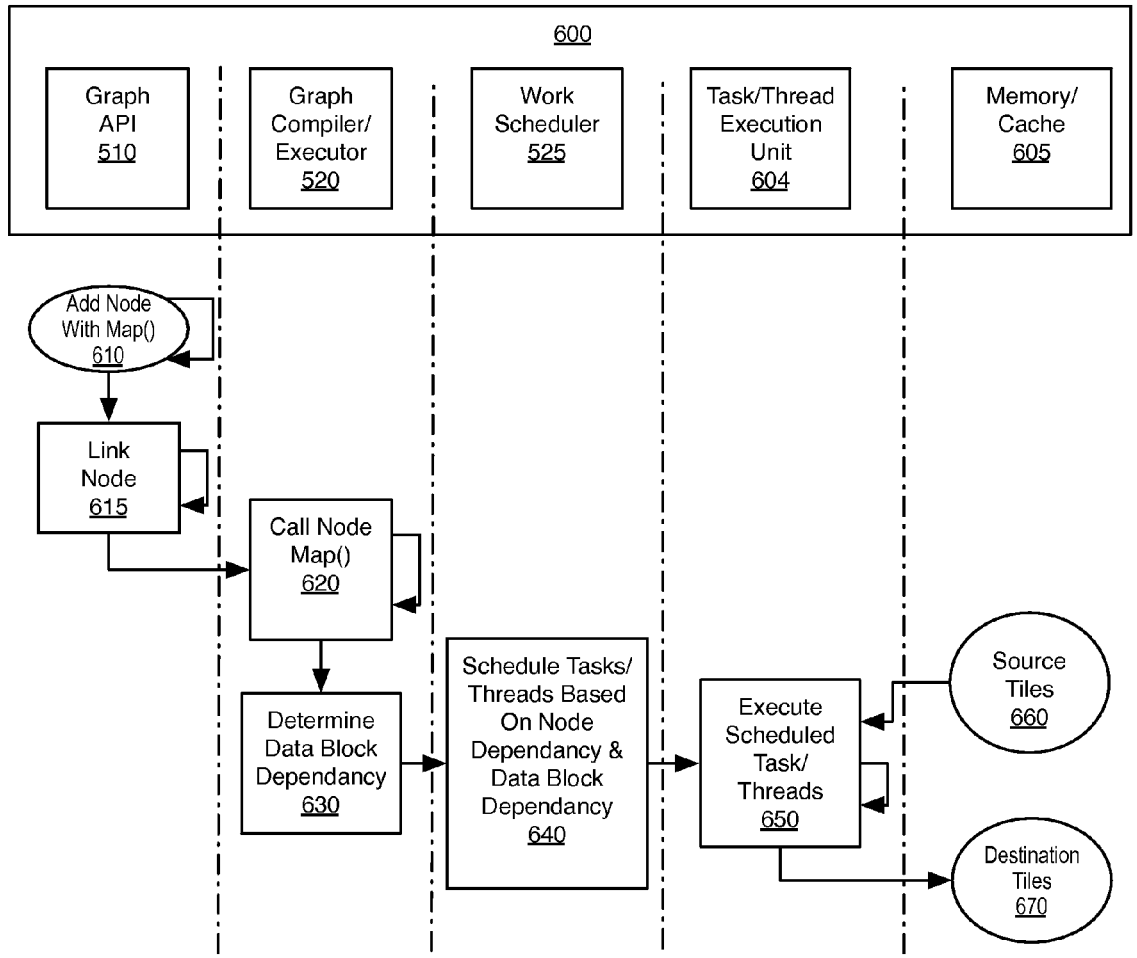
FIG. 6 is a functional block diagram depicting an image processing pipeline implementation including node-defined data block dependency mapping optimizations, in accordance with some embodiments.

FIG. 6 is a functional block diagram depicting an image processing pipeline implementation including node-defined data block dependency mapping optimizations. Not all depicted operations need be performed by a single implementation or contemporaneously. For example, graph creation operations 610, 615 may be performed during image pipeline develop time in advance of graph compile and/or execution operations 620, 630 performed during image pipeline runtime. In FIG. 6, vertical dash lines demark the functional elements enlisted in performance of the depicted operations. API 510 is employed to add and link graph nodes having a data block mapping function at operations 610, 615. Graph compiler 520 issues calls to node mapping function at operation 620 and determines data block dependency at operation 630. Work scheduler 525 schedules tasks/threads based on node dependency and data block dependency at operation 640. Task/thread execution unit 604 (e.g., a CPU core, GPU EU, IPU VU, etc.) executes scheduled tasks/threads at operation 650, reading source tiles 660 from an electronic memory and/or cache 605, and writing destination tiles 670 to memory and/or cache 605.

Figure 7:
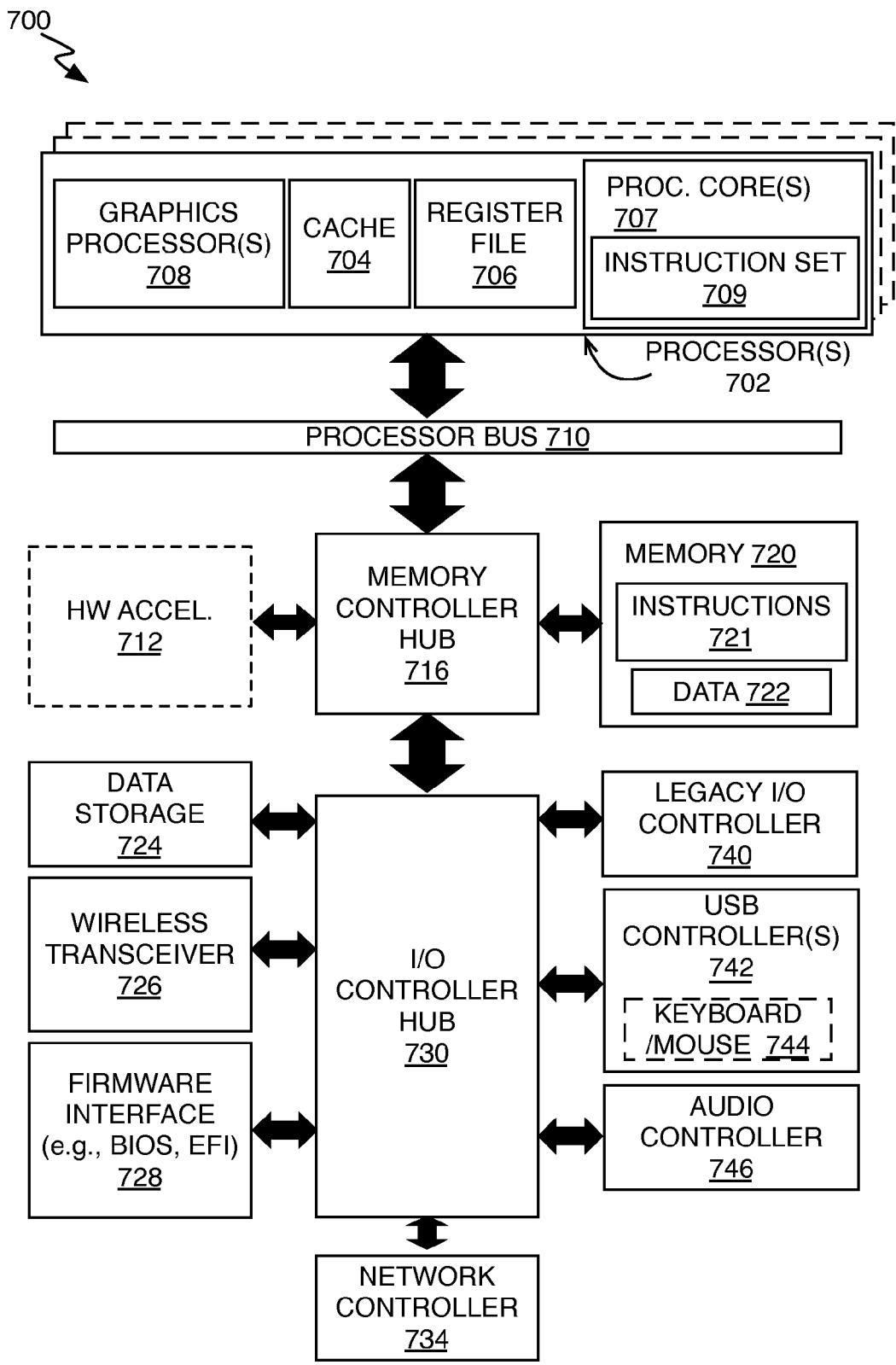
FIG. 7 is a functional block diagram of a data processing system, in accordance with some embodiments.

FIG. 7 is a functional block diagram of a data processing system 700 that may be utilized to perform graph processing with node defined data block based scheduling in accordance with some embodiments. Data processing system 700 includes one or more processors 702 and one or more graphics processors 708, and may be a single processor mobile device or desktop device, a multiprocessor workstation, or a server system having a large number of processors 702 or processor cores 707. In on embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit data signals between processor 702 and other components in system 700. System 700 has a 'hub' system architecture, including a memory controller hub 716 and an input output (I/O) controller hub 730. Memory controller hub 716 facilitates communication between a memory device and other components of system 700, while I/O Controller Hub (ICH) 730 provides connections to I/O devices via a local I/O bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processor 702 executes a process. Memory controller hub 716 also couples with an optional external hardware accelerator 712, which may communicate with the one or more graphics processors 708 in processors 702 to perform graphics and media operations.

In some embodiments, ICH 730 enables peripherals to connect to memory 720 and processor 702 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
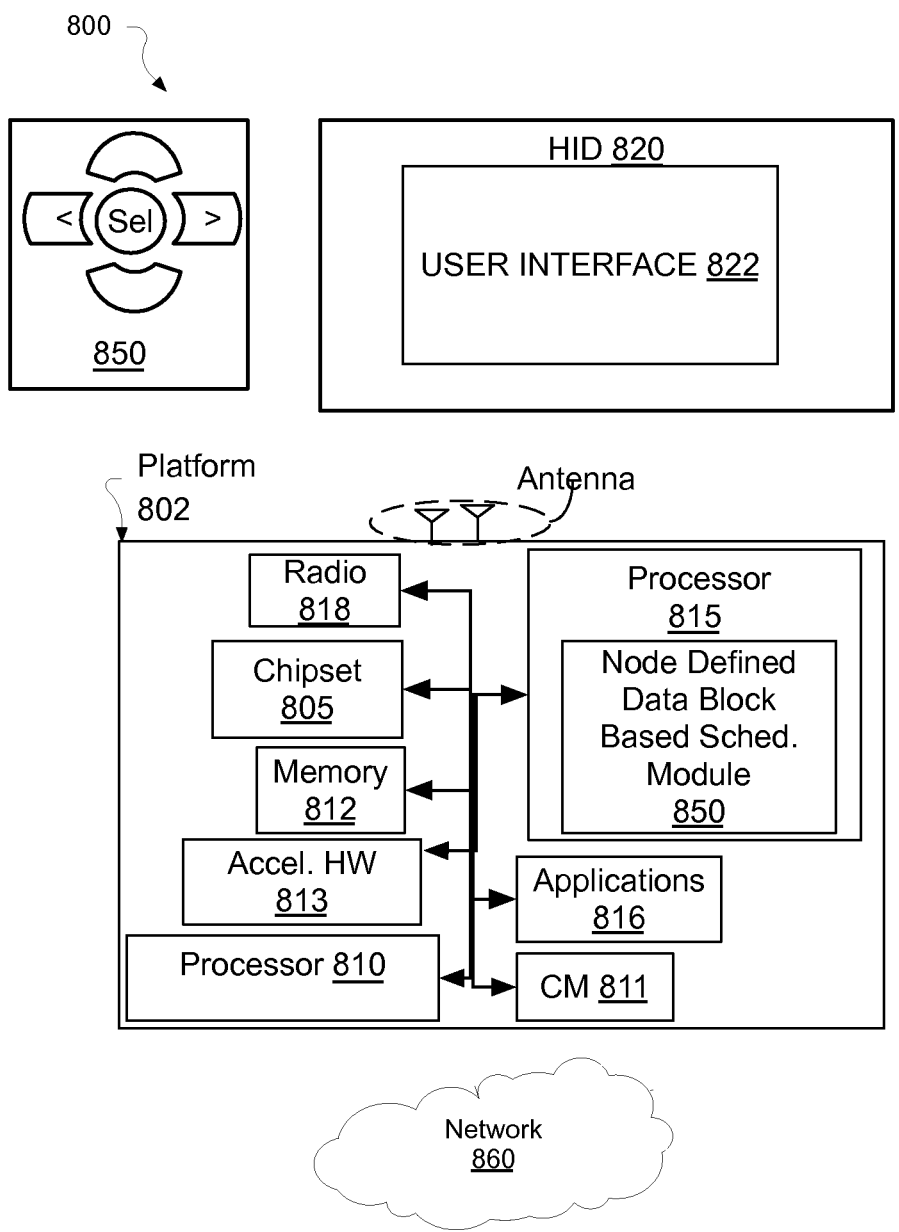
FIG. 8 is a diagram of an exemplary ultra-low power system including a processor with node defined data block based scheduling logic, in accordance with some embodiments.

FIG. 8 is a diagram of an exemplary ultra-low power system 800 employing a node defined data block based scheduling module, in accordance with one or more embodiment. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the various node data block mapping methods described above in the context of FIG. 1A-FIG. 6. In embodiments, components of platform 802 are further implemented following the architecture of system 700 (FIG. 7). In various exemplary embodiments, central processor 815 executes node defined data block based scheduling logic 850, for example including a graph compiler and/or work scheduler configured to determine and account for data block dependencies, for example as described elsewhere herein. Graphics processor 815 includes logic circuitry implementing an image graph compiler configured to make data mapping function calls one or more image graph nodes, for example as described elsewhere herein. In some embodiments, one or more computer readable media may store instructions, which when executed by CPU 815 and/or graphics processor 810, cause the processor(s) to execute one or more node-defined data block based scheduling operations.

In embodiments, device platform 802 is coupled to a human interface device (HID) 820. Platform 802 may collect raw image data with a camera module (CM) 811, which is processed and output to HID 820. A navigation controller 850 including one or more navigation features may be used to interact with, for example, device platform 802 and/or HID 820. In embodiments, HID 820 may include any monitor or display coupled to platform 802 via radio 818 and/or network 860. HID 820 may include, for example, a computer display screen, touch screen display, video monitor, television-like device, and/or a television.

In embodiments, device platform 802 may include any combination of CM 811, chipset 805, processors 810, 815, memory/storage 812, accelerator 813, applications 816, and/or radio 818. Chipset 805 may provide intercommunication among processors 810, 815, memory 812, accelerator 813, applications 816, or radio 818.

One or more of processors 810, 815 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The node-level data block mapping functions and function calls comporting with exemplary embodiments described herein may be implemented in various hardware architectures, cell designs, or "IP cores."

Figure 9:
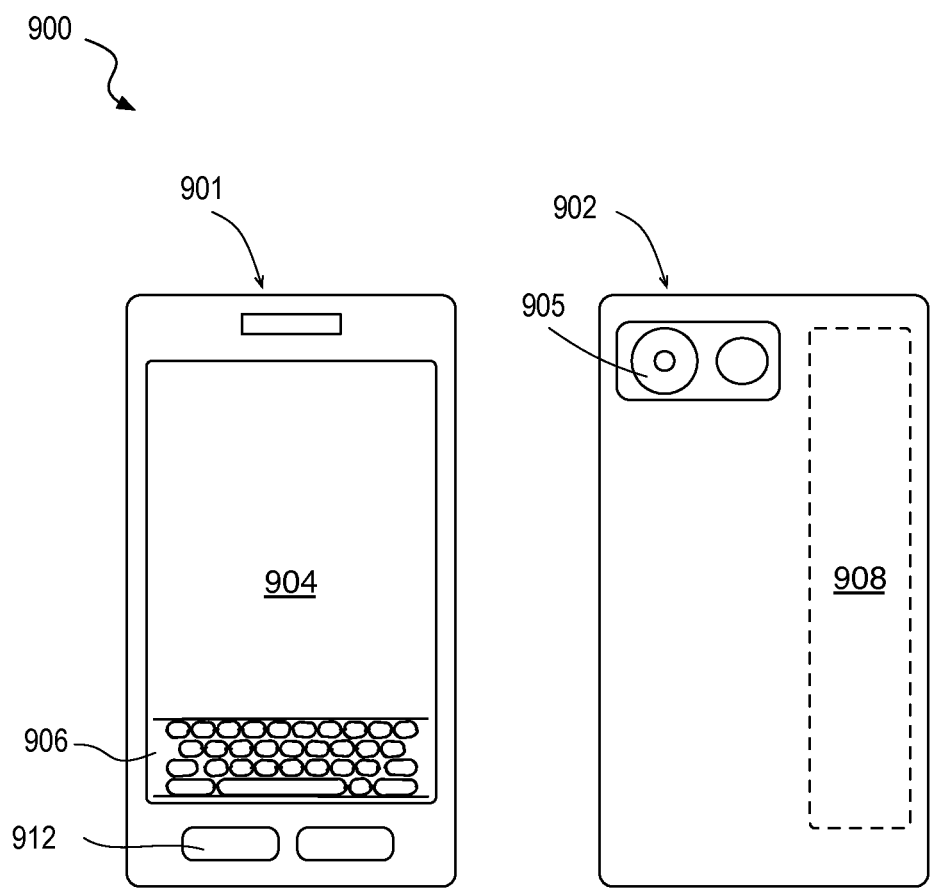
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset device 900 in which platform 802, system 700, implementation 600 and/or implementation 500 may be embodied. In embodiments, for example, device 900 may be a mobile computing handset device having wireless and image processing capabilities. As shown in FIG. 9, mobile handset device 900 may include a housing with a front 901 and back 902. Device 900 includes a display 904, an input/output (I/O) device 906, and an integrated antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. Embodiments are not limited in this context. Integrated into at least the back 902 is camera 905 (e.g., including a lens, an aperture, and an imaging sensor), which may be components of one or more CM through which image data is exposed and output to graph optimized imaging pipeline, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In one or more first embodiments, an apparatus, comprises an image graph compiler to receive an image graph specifying a pipeline of image processing operations. The graph compiler is further to determine, from a node in the graph, a source data block upon which a destination data block output by the node depends, and generate data block dependency information indicative of the destination data block dependency determined for the source data block.

In furtherance of the first embodiments, the image graph compiler is to determine the source data block upon which the destination data block depends by issuing a call to a mapping function associated with the node.

In furtherance of the first embodiments, the image graph compiler is to generate data block dependency information indicative of a destination-source data block dependence determined for each of a plurality of nodes by traversing the graph and successively issuing a plurality of calls to a mapping function associated with each traversed node.

In furtherance of the first embodiments, the apparatus further comprises a work scheduler to schedule execution of image processing tasks based, at least in part, on the data block dependency information, one or more hardware resource to execute image processing tasks scheduled by the work scheduler, and an electronic memory to store one or more of the source and destination data block.

In furtherance of the first embodiments, the apparatus further comprises a graph-based implementation application programming interface (API) configured to associate a plurality of image processing operations into an image processing pipeline based on a graph of nodes, wherein the API includes a framework for defining dependency of a destination data block to be output by a node on a source data block to be input the node.

In furtherance of the embodiment immediately above, the API framework includes a data block mapping function to define the dependency at the graph node level.

In furtherance of the embodiment immediately above, the mapping function is to receive a parameterization of a destination tile corresponding to a first data block memory location and is to return a parameterization of a source tile corresponding to a second data block memory location.

In furtherance of the first embodiments, the apparatus further comprises a graph-based implementation application programming interface (API) configured to associate a plurality of image processing operations into an image processing pipeline based on a graph of nodes, wherein the API includes a framework for defining dependency between a first destination data block to be output by a node and a second destination data block to be output by the node.

In furtherance of the embodiment immediately above, the framework comprises node-level mapping function to receive a parameterization of a first destination tile corresponding to a first data block memory location and is to return a parameterization of a second destination tile corresponding to a second data block memory location.

In one or more second embodiments, a computer implemented image processing method comprises receiving an image graph specifying a pipeline of image processing operations, determining, from a node in the graph, a source data block upon which a destination data block output by the node depends, and generating data block dependency information indicative of the destination data block dependency determined for the source data block.

In furtherance of the second embodiments, the method further comprises determining the source data block upon which the destination data block depends by issuing a call to a mapping function associated with the node.

In furtherance of the second embodiments, the method further comprises generating data block dependency information indicative of a destination-source data block dependence for each of a plurality of nodes by traversing the graph and successively issuing a plurality of calls to a mapping function associated with each traversed node.

In furtherance of the second embodiments, the method further comprises scheduling execution of image processing tasks based, at least in part, on the data block dependency information, executing image processing tasks scheduled by the work scheduler, and storing one or more of the source and destination data block.

In furtherance of the second embodiments, the method further comprises associating a plurality of image processing operations into an image processing pipeline based on a graph of nodes by defining dependency of a destination data block to be output by a node on a source data block to be input the node.

In furtherance of the second embodiments, the method further comprises calling data block mapping function the defines the source-destination dependency at the graph node level.

In furtherance of the embodiment immediately above, the method further comprises providing to the mapping function, a parameterization of a destination tile corresponding to a first data block memory location, and receiving from the mapping function a parameterization of a source tile corresponding to a second data block memory location.

In furtherance of the second embodiments, the method further comprises determining a dependency between a first destination data block to be output by a node and a second destination data block to be output by the node.

In furtherance of the embodiment immediately above, determining the dependency between a first destination data block to be output by a node and a second destination data block to be output by the node further comprises providing to a node-level mapping function a parameterization of a first destination tile corresponding to a first data block memory location, and receiving from the mapping function a parameterization of a second destination tile corresponding to a second data block memory location.

In one or more third embodiments, one or more computer-readable storage media includes instructions stored thereon, which when executed by a processor, cause the processor to perform any of the second embodiments.

In one or more fourth embodiments, one or more computer-readable storage media includes instructions stored thereon, which when executed by a processor, cause the processor to perform a method comprising determining, from a node in an image graph specifying a pipeline of image processing operations, a source data block upon which a destination data block output by the node depends, and generating data block dependency information indicative of the destination data block dependency determined for the source data block.

In one or more fifth embodiments, an apparatus comprises means to perform any one of the second embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. An image processing apparatus, comprising:
   one or more processors to:
   receive a plurality of source data blocks, wherein individual source data blocks are each associated with a fragment of a source image to be processed into a destination image;
   receive an image graph specifying a pipeline comprising a plurality of image processing operations to be performed on each of the source data blocks to generate corresponding fragments of the destination image;
   determine, from one or more mapping functions associated with each node in the graph, data block dependency information indicative of a first data block upon which a second data block output by the corresponding node depends, wherein each of the first and second data blocks is associated with an image fragment;

schedule execution of the image processing operations based, at least in part, on the data block dependency information; and execute the image processing operations as scheduled; and an electronic memory to store the first data blocks and second data blocks as they are consumed and produced by the processors.

2. The apparatus of claim 1, wherein the processor is to determine the first data block upon which the second data block depends for each node by issuing a call to the one or more mapping functions associated with the corresponding node.

3. The apparatus of claim 1, wherein the processor is to generate data block dependency information indicative of a second-first data block dependence determined for each of the nodes by traversing the graph and successively issuing a call to the one or more mapping functions associated with each traversed node.

4. The apparatus of claim 1,
wherein the processor is to execute a graph-based implementation application programming interface (API) configured to associate a plurality of image processing operations into an image processing pipeline based on a graph of nodes, wherein the API includes a framework for defining dependency of the second data block to be output by one of the nodes on the first data block to be input the node.

5. The apparatus of claim 4, wherein the API framework includes a parameterization of the one or more mapping functions to define the dependency at the graph node level.

6. The apparatus of claim 5, wherein the mapping function is to receive a parameterization of the image fragment corresponding to the second data block stored at a first memory location and is to return a parameterization of the image fragment corresponding to the first data block stored at a second memory location.

7. The apparatus of claim 1, further comprising:
wherein the processor is to execute a graph-based implementation application programming interface (API) configured to associate a plurality of image processing operations into an image processing pipeline based on a graph of nodes, wherein the API includes a framework for defining dependency between two or more second data blocks to be output by one of the nodes.

8. The apparatus of claim 7, wherein the framework comprises node-level mapping function to receive a parameterization of a first image fragment corresponding to one of the second data blocks stored at a first memory location and is to return a parameterization of a second image fragment corresponding to another of the second data blocks stored at a second memory location.

9. A computer implemented image processing method comprising:
receiving a plurality of source data blocks, wherein individual source data blocks are each associated with a fragment of a source image to be processed into a destination image;
receiving an image graph specifying a pipeline comprising a plurality of image processing operations to be performed on each of the source data blocks to generate corresponding fragments of the destination image;
determining, from one or more mapping functions associated with each node in the graph, data block dependency information indicative of a first data block upon which a second data block output by the corresponding node depends, wherein each of the first and second data blocks is associated with an image fragment;
scheduling execution of the image processing operations based, at least in part, on the data block dependency information;
executing the image processing operations as scheduled; and
storing, to an electronic memory, the first data blocks and second data blocks as they are consumed and produced.

10. The method of claim 9, further comprising determining the first data block upon which the second data block depends for each node by issuing a call to the one or more mapping functions associated with the corresponding node.

11. The method of claim 9, further comprising:
generating data block dependency information indicative of a second-first data block dependence for each of the nodes by traversing the graph
and successively issuing a call to the one or more mapping functions associated with each traversed node.

12. The method of claim 9, further comprising:
providing to the mapping functions, a parameterization of the image fragment corresponding to the second data block stored at a first memory location; and
receiving from the mapping functions a parameterization of the image fragment corresponding to the first data block stored at a second memory location.

13. The method of claim 9, further comprising determining a dependency between two or more second data blocks to be output by one of the nodes.

14. The method of claim 13, wherein determining the dependency between two or more second data blocks to be output by one of the nodes further comprises:
providing to a node-level mapping function a parameterization of a first image fragment corresponding to one of the second data blocks stored at a first memory location; and
receiving from the mapping function a parameterization of a second image fragment corresponding to another of the second data blocks stored at a second memory location.

15. One or more non-transitory computer-readable storage media, with instructions stored thereon, which when executed by a processor, cause the processor to perform a method comprising:
receiving a plurality of source data blocks, wherein individual source data blocks are each associated with a fragment of a source image to be processed into a destination image;
receiving an image graph specifying a pipeline comprising a plurality of image processing operations to be performed on each of the source data blocks to generate corresponding fragments of the destination image;
determining, from one or more mapping functions associated with each node in the graph, data block dependency information indicative of a first data block upon which a second data block output by the corresponding node depends, wherein each of the first and second data blocks is associated with an image fragment;
scheduling execution of the image processing operations based, at least in part, on the data block dependency information;
executing the image processing operations as scheduled; and storing, to an electronic memory, the first data blocks and second data blocks as they are consumed and produced.

16. The media of claim 15, further including instructions stored thereon, which when executed by a processor, cause the processor to perform the method further comprising:
generating data block dependency information indicative of a second-first data block dependence for each of the nodes by traversing the graph and successively issuing a call to the one or more mapping functions associated with each traversed node.

* * * * *